United States Patent [19]

Brogardh et al.

[11] 4,430,565

[45] Feb. 7, 1984

[54] CORRELATING FIBER OPTICAL MEASURING DEVICE

[75] Inventors: Torgny Brogardh; Lars Sander, both of Västerås, Sweden

[73] Assignee: ASEA Aktiebolag, Västerås, Sweden

[21] Appl. No.: 304,955

[22] Filed: Sep. 23, 1981

[30] Foreign Application Priority Data

Sep. 24, 1980 [SE] Sweden ............................. 8006679

[51] Int. Cl.³ .......................... G01J 3/34; G01D 5/34
[52] U.S. Cl. ................................. 250/227; 250/231 R
[58] Field of Search ................... 250/227, 226, 231 R, 250/345, 338; 356/418; 350/96.15

[56] References Cited

U.S. PATENT DOCUMENTS 4,249,076 2/1981 Bergstrom et al. ................ 250/227

FOREIGN PATENT DOCUMENTS 1248019 of 0000 United Kingdom .

Primary Examiner—David C. Nelms
Assistant Examiner—Jere Brophy
Attorney, Agent, or Firm—Watson, Cole, Grindle et al.

[57] ABSTRACT

The invention relates to a fiber optical measuring device for measuring physical and/or chemical parameters. The device comprises a transducer unit and an evaluating unit, connected via at least one light conductor. One or more light sources in the evaluating unit, via said at least one light conductor, illuminate one or more optical filters located in the transducer unit which filter(s) is (are) sensitive to the parameter being measured. An optical detector arrangement in the evaluating unit analyses the light emanating from the transducer unit. The detector arrangement consists of one or more photo-detectors, arranged to sense the light emitted from the transducer unit after this light has been affected by at least one filter belonging to the detector arrangement. The spectral properties of the detector filter(s) are controlled so that the detector arrangement is able to measure the correlation between the spectra of the transducer and detector filters. The correlation values are used as a measure of the condition of the transducer filter and thus of the parameter(s) being measured.

17 Claims, 9 Drawing Figures

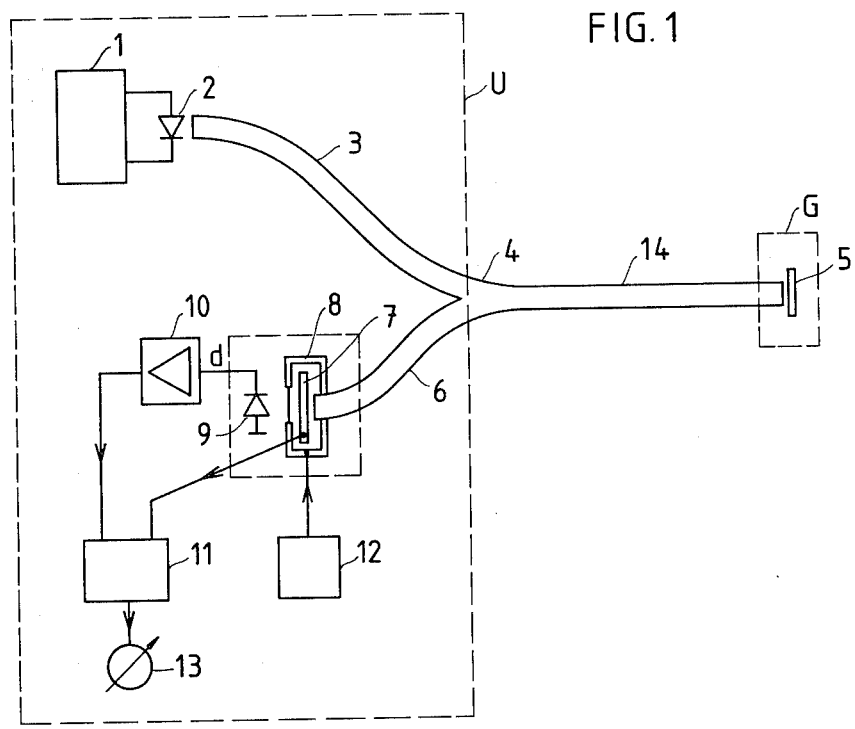
FIG. 1
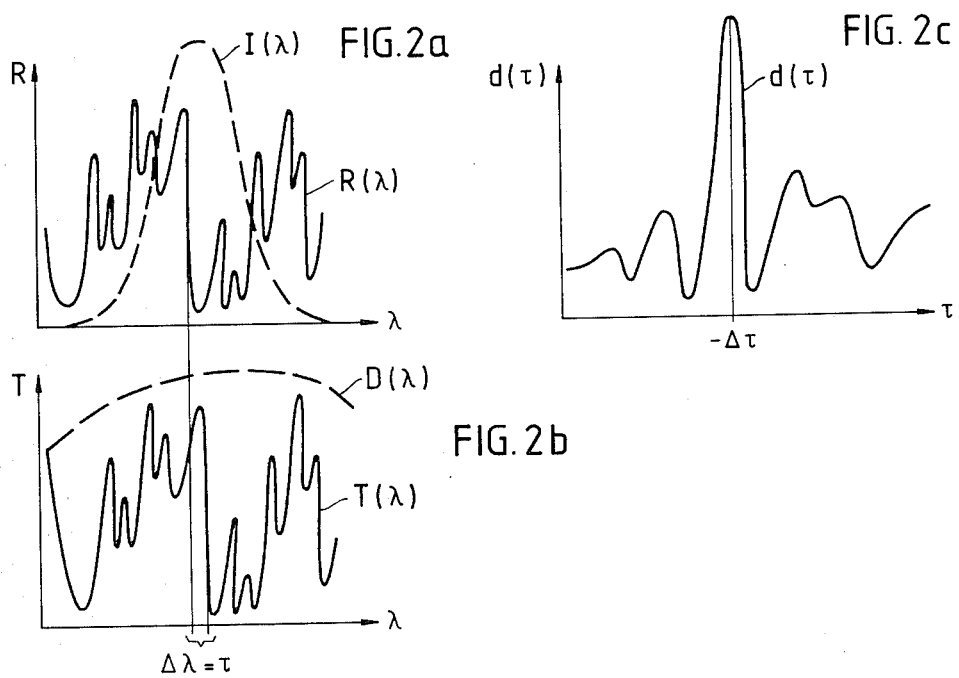
FIG. 2a
FIG. 2b
FIG. 2c

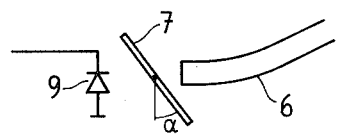
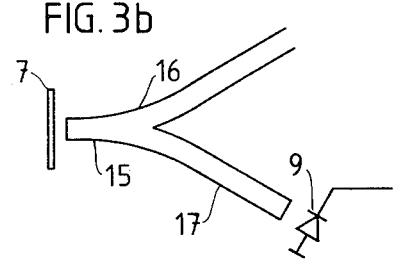
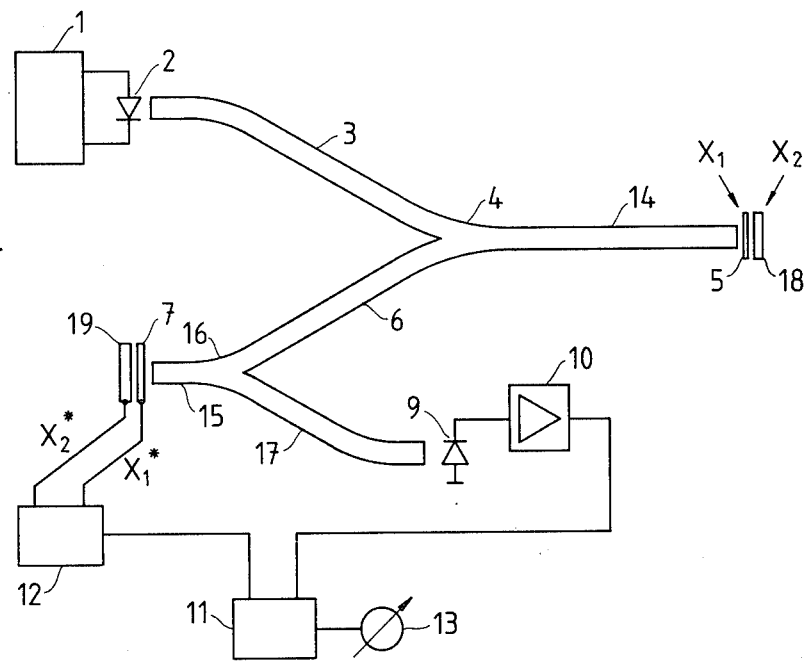
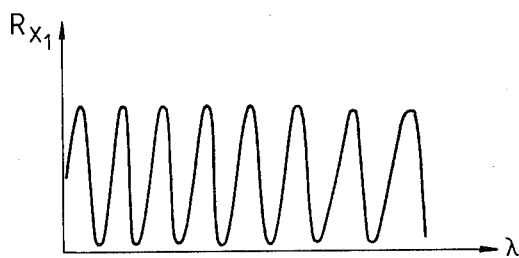
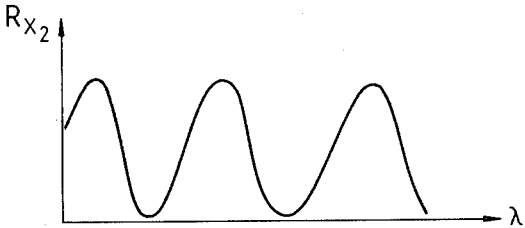

CORRELATING FIBER OPTICAL MEASURING DEVICE

TECHNICAL FIELD

The present invention relates to a fiber optical measuring device for measuring at least one physical and/or chemical parameter consisting of a transducer unit at the measurement site and an evaluating unit, interconnected via at least one light conductor. One or more incident light sources are located in the evaluating unit, and light from each such light source illuminates one or more optical filters, located in the transducer unit, such that the spectral response of such filter(s) is affected by the parameter to be measured. An optical detector arrangement is also provided in the evaluating unit for analysis of the light emanating from the filter(s) in the transducer unit. Throughout this specification the word "light" should be taken to include not only electromagnetic radiation having wavelengths lying within the visible spectrum, but also wavelengths lying somewhat outside the visible spectrum.

DISCUSSION OF PRIOR ART

U.K. patent application No. 2 025 608 (published Jan. 23, 1980) describes a fiber optical measuring device for measuring physical quantities, based on the use of optical fibers in a measuring transducer unit in order to generate a measuring signal. To compensate for varying attenuation in the light conductors between the transducer unit and the measuring electronic system, a stabilizing signal has to be generated. This requires that the spectral properties of the transducer unit are measured at two wavelengths, which results in a measuring electronic system with a relatively complex optoelectronic unit, especially when light-emitting diodes and filters have to be temperature-stabilized.

DISCLOSURE OF THE INVENTION

The present invention aims to provide a solution to the above-mentioned problems and other problems associated therewith. The invention relates to a measuring device which measures the spectral change, induced by the parameter to be measured, of a filter included in the transducer unit, in which case temperature-stabilized light sources and photo-detectors are not required. The measuring device is insensitive to varying attenuation and reflection losses in the fiber system and is based on detecting a cross-correlation between the spectral properties of two filters. The invention is characterised in that the detector arrangement in the evaluating unit consists of one or more photodetectors arranged to sense the light emanating from the transducer unit after this light has been transmitted and/or reflected through and/or against one or more filters belonging to the detector arrangement. Means is provided for wavelength displacement of the transmission and/or reflection spectrum of the detector filter/filters, which is a measure of the parameter being measured. The detector arrangement is capable of measuring the correlation between the spectra of the transducer filter and the detector filter as the spectrum of the detector filter is changed, that is, $d(F_D) = \int F_G(\lambda) \cdot F_D(\lambda) \cdot d\lambda$, where $F_G(\lambda)$ and $F_D(\lambda)$ are the spectra of the transducer and detector filters, respectively, and that the correlation values ($d(F_D)$) in case of one or more spectral distributions of the detector filter ($F_D$) are used as a measure of the condition of the transducer filter and thus of the parameter being measured.

BRIEF DESCRIPTION OF DRAWINGS

The invention will be exemplified in greater detail, by way of example, with reference to the accompanying drawings, in which:

FIG. 1 shows, in schematic form one embodiment of a measuring device according to the invention, FIG. 2a shows the reflection curve for the filter in the transducer unit of FIG. 1, FIG. 2b shows the transmission curve of the filter in the evaluating unit of FIG. 1, FIG. 2c shows the cross correlation signal resulting from the curves of FIGS. 2a and 2b, FIG. 3a shows how a filter can be adjusted by turning, FIG. 3b shows a modified form of light coupling in this connection for the arrangement of FIG. 3a, FIG. 4 shows a second embodiment of measuring device allowing simultaneous measurement of two quantities to be measured, and FIGS. 5a and 5b show reflection spectra for the two different filters used in the embodiment of FIG. 4.

DESCRIPTION OF SPECIFIC EMBODIMENTS

In a measuring device according to FIG. 1, an LED (light-emitting diode) 2 is driven by a supply device 1, whereby incident light is transmitted through an optical fiber 3, a fiber branch 4 and an optical fiber 14 to a filter 5 in a transducer unit G, the reflection spectrum $R(\lambda)$ of which is shown as the continuous curve in FIG. 2a. The evaluating unit of the measuring device is shown by the dash line rectangle U in FIG. 1. FIG. 2a also shows the emission spectrum $I(\lambda)$ of the LED 2.

The light reflected by the filter 5 is passed via the fiber 14 to the branch 4, from which part of the light is forwarded along a fiber 6 to a filter 7 within the evaluating unit U, the transmission curve $T(\lambda)$ of which is shown in FIG. 2b. Its spectrum corresponds largely to the spectrum of the filter 5. Adjacent to the filter 7 there is arranged a photo-detector 9. FIG. 2b also shows the sensitivity spectrum $D(\lambda)$ of the photo-detector 9. The magnitude d of the signal received by the photo-detector 9 may be expressed as $$d = {_0}\!\int^{\infty} I(\lambda) \cdot R(\lambda) \cdot T(\lambda) \cdot D(\lambda) \cdot d\lambda.$$

Now the spectrum $T(\lambda)$ may be displaced with regard to wavelength $T(\lambda - \tau)$ by regulating the temperature of a filter furnace 8 enclosing the filter 7 whose temperature is controlled by a regulating unit 12. At the same time, the temperature of the filter 7 is measured by a measuring device 11, which also analyzes the signal d for different valves of $\tau$, that is, the signal $$d(\tau) = {_0}\!\int^{\infty} I(\lambda) \cdot D(\lambda) \cdot R(\lambda) \cdot T(\lambda - \tau) \cdot d\lambda.$$

There is a cross correlation between R and T, which is shown in FIG. 2c and has a maximum when R and T correspond, that when $\tau = -\Delta\lambda$. By analyzing the cross correlation signal according to FIG. 2c, in the electronic unit 11, wavelength displacement and change of shape of $R(\lambda)$ can be measured and thus also the quantity to be measured can be deduced. $R(\lambda)$ can be obtained directly as the reflection from an interference filter. When using an absorption filter in the transducer unit G, a mirror is suitably placed at the rear thereof, if a separate fiber is not employed to conduct transmitted light to the photo-detector 9.

When using an interference filter, instead of heating the filter 7 to vary its spectral response, the filter 7 can be rotated in the manner shown in FIG. 3a. The turning angle $\alpha$ then provides the wavelength displacement $\tau$ in the above expression for $d(\tau)$. If the filter 5 is of the interference type, part of the same filter with absolutely the same reflection spectrum can be cut off and used as a reference filter 7.

As shown in the arrangement of FIG. 3b, the light from the filter 5 is conducted from the transducer unit G to the filter 7 via a branch 16 and a light fiber conductor 15, and part of the light reflected by the filter 7 is conducted back via the fiber 15, the branch 16 and a fiber 17 to the photo-detector 9. In this way, identical optical conditions may be obtained for the filters 5 and 7, which results in the obtaining of sharp correlation peaks and thus the possibility for very high accuracy in measuring.

To obtain as large a correlation peak as possible (cf. $d(-\Delta\lambda)$ in FIG. 2c), filters 5 and 7 should be used having as large and as similar (with respect to the wavelength) reflection and/or transmission spectra variations as possible. A reasonable requirement is that at least two reflection and/or transmission peaks appear within the emission spectrum $I(\lambda)$ of the light source. Suitable filters for obtaining spectra with "fine structure" are interference filters, Fabry-Perrot resonators, Bragg filters, and filters doped with substances which give sharp absorption lines. As regards interference filters, one of the thin film layers is suitably made thick in relation to the other layers. A Fabry-Perrot resonator may consist of a quartz plate of a thickness of a few $\mu m$, coated on both sides with a metal layer. Doped glass may be used as an absorption filter.

FIG. 4, shows how a measuring device according to FIG. 1, with minor modifications, can also be used for the simultaneous measurement of more than one quantity. As will be clear from FIG. 4, to make possible simultaneous measurement of two quantities, two filters 5 and 18 are provided in the transducer unit. One quantity $X_1$ influences the filter 5 and a second quantity $X_2$ influences the filter 18. In the evaluating unit, there are also two filters 7 and 19, the filter 7 having a response spectrum which is as similar to the response spectrum of the filter 5 as possible and the filter 19 having a response spectrum which is as similar to the response spectrum of the filter 18 as possible. When the quantities $X_1$ and $X_2$ change, the response spectra of the filters 7 and 5 and of the filters 19 and 18 will deviate mutually, and each deviation can be recorded by the photo-detector 9 by means of the previously described correlation process. At a maximum correlation, $X_1^* = X_1$ and $X_2^* = X_2$, where $X_1^*$ and $X_2^*$ are the quantities to be measured simulated in the analyzer. If, for example, $X_1$ is temperature and $X_2$ is temperature and magnetic field, both $X_1^*$ and $X_2^*$ may be temperature, where the temperature difference between the filter 19 and the filter 7 constitutes the value of the magnetic field. By suitably choosing the filters 7 and 19, $X_1^*$ and $X_2^*$ can be generated in other ways than by a temperature regulation, for example by a turning of an interference filter, by a generation of an electric field across a Fabry-Perrot resonator with an electro-optical spacer, or by the generation of an electric voltage applied to a piezoelectrically controlled Fabry-Perrot resonator.

Examples of reflection spectra for the filters 5 and 7 and the filters 18 and 19, respectively, are given in FIGS. 5a and 5b, respectively. If each spectrum is considered to be a sinusoidal signal $\alpha + \beta \cdot \sin \omega\lambda$, it will be appreciated that $\omega_1$ for $X_1$ is greater than $\omega_2$ for $X_2$, and a so-called frequency multiplexing for electric signals is obtained. Theoretically, measuring information for an unlimited number of parameters can be transmitted along a single fiber 14 by providing a filter with a spectrum frequency $\omega_i$ for each quantity $X_i$ to be measured. The filtering out of each quantity $X_i$ to be measured in the evaluating unit is performed by correlation with an appropriate filter in the unit U, which also has the spectrum frequency $\omega_i$.

The embodiments specifically described above may be varied in many ways within the scope of the following claims and all such variations are intended to be covered thereby.

What is claimed is:

1. A fiber optical measuring device for measuring, at a measurement point, at least one parameter of an object comprising:
   a transducer unit at the measuring point having at least one optical transducer filter with a response spectrum subjected to wavelength displacement by said at least one parameter to be measured,
   an evaluating unit separated from the transducer unit, said evaluating unit including at least one source of incident light and an optical detector arrangement for analyzing light emanating from the transducer unit, and
   at least one light conductor for feeding incident light to the transducer unit and for feeding light emanating from said at least one optical transducer filter to the evaluating unit,
   wherein the detector arrangement includes at least one optical detector filter, means to subject the response spectrum thereof to wavelength displacement by the light emanating from said at least one optical transducer filter and means to measure the correlation between the spectra of a transducer filter and a corresponding detector filter to determine the spectral condition of the said transducer filter and thus determine the magnitude of the at least one parameter being measured.

2. A measuring device as claimed in claim 1, in which said transducer filter and said detector filter are both transmission filters.

3. A measuring device as claimed in claim 1, in which said transducer filter and said detector filter are both reflection filters.

4. A measuring device according to claim 1, in which the transducer unit and the detector arrangement include optical filters which are matched pairwise, so that a transducer filter corresponds to a detector filter with a corresponding spectrum structure within at least part of the spectrum thereof.

5. A measuring device according to claim 1, comprising two or more transducer filters having non-identical optical characteristics.

6. A device according to claim 4, in which each parameter to be measured produces a wavelength displacement of the spectrum of a corresponding optical transducer filter, and the evaluating electronic unit comprises means for wavelength displacement of the detector filter, and the detector signal from a photodetector of the detector arrangement, as a function of the wavelength displacement of the detector filter, is arranged to be supplied to computing electronic equipment for analysis of the correlation between the spectra of the transducer and detector filters.

7. A measuring device according to claim 5, in which said transducer filters have differently varying spectral curves with respect to wavelength, and said transducer filters are arranged to be influenced by said parameters to be measured by at least one parameter per filter, and that demultiplexing of said parameters to be measured is arranged to be carried out by a correlation process with one detector filter for each transducer filter.

8. A measuring device according to claim 1, wherein said transducer unit further includes means for varying the temperature of an interference-based filter to vary the optical wavelength thereof to obtain said wavelength displacement of the filter spectrum.

9. A measuring device according to claim 1, wherein said evaluating unit further includes means for turning an interference-based filter to obtain said wavelength displacement.

10. A measuring device according to claim 1, wherein said transducer unit further includes means for causing an electric field to influence the optical wavelength of an electro-optical layer in a filter of the interference type to obtain said wavelength displacement.

11. A measuring device according to claim 1, wherein said transducer unit further includes means for causing a magnetic field to influence the optical wavelength of a magneto-optical layer in a filter of the interference type.

12. A measuring device according to claim 1, wherein said transducer unit further includes means for causing a mechanical modulation of the optical wavelength in a filter of the interference type to obtain said wavelength displacement.

13. A measuring device according to claim 12, in which the mechanical modulation is obtained by means of at least one piezo-electric modulator.

14. A measuring device according to claim 1, wherein said transducer unit further includes means for causing temperature to influence the position, with respect to wavelength, of the absorption spectrum in an absorption filter to obtain said wavelength displacement.

15. A measuring device according to claim 1, wherein said transducer unit further includes means for causing pressure to influence the position, with respect to wavelength, of the absorption spectrum in an absorption filter to obtain said wavelength displacement.

16. A fiber optical measuring device comprising:
a transducer unit at the measuring point having at least one optical transducer filter with a response spectum subjected to wavelength displacement by a parameter to be measured,
an evaluating unit separated from the transducer unit, said evaluating unit including at least one source of incident light and an optical detector arrangement for analyzing light emanating from said at least one optical transducer filter, and
at least one light conductor for feeding incident light to the transducer unit and for feeding light emanating from said at least one optical transducer filter to the evaluating unit,
said detector arrangement including at least one photo-detector arranged to sense the light emanating from said at least one optical transducer filter after this light has impinged upon at least one optical spectral filter within the detector arrangement, and further including means for wavelength displacement of the spectrum of said at least one optical spectral filter, which is a measure of the parameter being measured, said photo-detector measuring the correlation between the spectrum of the transducer filter and of the detector filter as the spectrum of the detector filter is adjusted, that is, $$d(F_D) = \int F_G(\lambda) \cdot F_D(\lambda) \cdot d\lambda,$$

where $F_G(\lambda)$ and $F_D(\lambda)$ are the spectra of the transducer filter and the detector filter, respectively, and that the correlation values ($d(F_D)$) in the case of one or more spectral distributions of the detector filter are used as a measure of the condition of the transducer filter and thus of the parameter being measured.

17. A measuring device according to claim 16, wherein the output signal of said photo-detector is arranged to be measured as a function of at least one parameter, of the spectrum ($F_D$) of the detector filter, and that said evaluating electronic unit further includes means for calculating different parameters and the relative distances between, firstly, different correlation peaks, secondly, different correlation minima, and thirdly, correlation peaks and correlation minima, and that the thus obtained parameter values of the correlation signals with respect to different parameter values of the spectrum ($F_D$) of the detector filter are used to calculate the spectrum ($F_G$) of the transducer filter.

* * * * *